United States Patent
Copeland et al.

(10) Patent No.: US 10,934,894 B2
(45) Date of Patent: Mar. 2, 2021

(54) INVERTED BRAYTON CYCLE HEAT ENGINE

(71) Applicant: HIETA TECHNOLOGIES LIMITED, Bristol (GB)

(72) Inventors: Colin Copeland, Bristol (GB); Robert Ceen, Malvern (GB); Simon Jones, Bristol (GB)

(73) Assignee: HIETA TECHNOLOGIES LIMITED, Bristol (GB)

( * ) Notice: Subject to any disclaimer, the term of this patent is extended or adjusted under 35 U.S.C. 154(b) by 310 days.

(21) Appl. No.: 16/060,114

(22) PCT Filed: Dec. 9, 2016

(86) PCT No.: PCT/GB2016/053867
§ 371 (c)(1),
(2) Date: Jun. 7, 2018

(87) PCT Pub. No.: WO2017/098251
PCT Pub. Date: Jun. 15, 2017

(65) Prior Publication Data
US 2018/0371954 A1 Dec. 27, 2018

(30) Foreign Application Priority Data

Dec. 11, 2015 (GB) ..................................... 1521853

(51) Int. Cl.
*F01K 21/04* (2006.01)
*F01K 23/06* (2006.01)
(Continued)

(52) U.S. Cl.
CPC .......... *F01K 21/045* (2013.01); *F01K 23/065* (2013.01); *F01K 23/12* (2013.01);
(Continued)

(58) Field of Classification Search
CPC ...... F01K 21/045; F01K 23/065; F01K 23/12; F01N 2240/02; F02C 6/006; F02C 7/08; F02G 5/02; F02G 5/04; Y02T 10/166
See application file for complete search history.

(56) References Cited

U.S. PATENT DOCUMENTS

| 4,271,665 A | 6/1981 | Mandrin |
| 5,148,670 A | 9/1992 | Birch et al. |

(Continued)

FOREIGN PATENT DOCUMENTS

| CH | 701 133 | 11/2010 |
| CN | 103282620 | 9/2013 |

(Continued)

OTHER PUBLICATIONS

International Search Report and Written Opinion of the ISA for PCT/GB2016/053867 dated Mar. 17, 2017, 11 pages.

(Continued)

*Primary Examiner* — Jesse S Bogue
(74) *Attorney, Agent, or Firm* — Nixon & Vanderhye P.C.

(57) ABSTRACT

An apparatus (2) includes an internal combustion engine (4) and an inverted Brayton cycle heat engine (6). Hot exhaust gas from the internal combustion engine (4) contains water. The hot exhaust gas drives the inverted Brayton cycle heat engine. A condenser (22) in a fluid path of the exhaust gas between an inverted-Brayton-cycle turbine and an inverted-Brayton-cycle compressor condenses at least some of the water from the exhaust gas to form condensed water. This condensed water follows a recirculation path (30) so as to be re-introduced as a working fluid into one or more of the heat engines described above, or further heat engines, e.g. the condensed water is heated by the exhaust gas using a steam-generating heat exchanger (20) to generate steam which drives a steam turbine (32).

14 Claims, 3 Drawing Sheets

Figure 1:
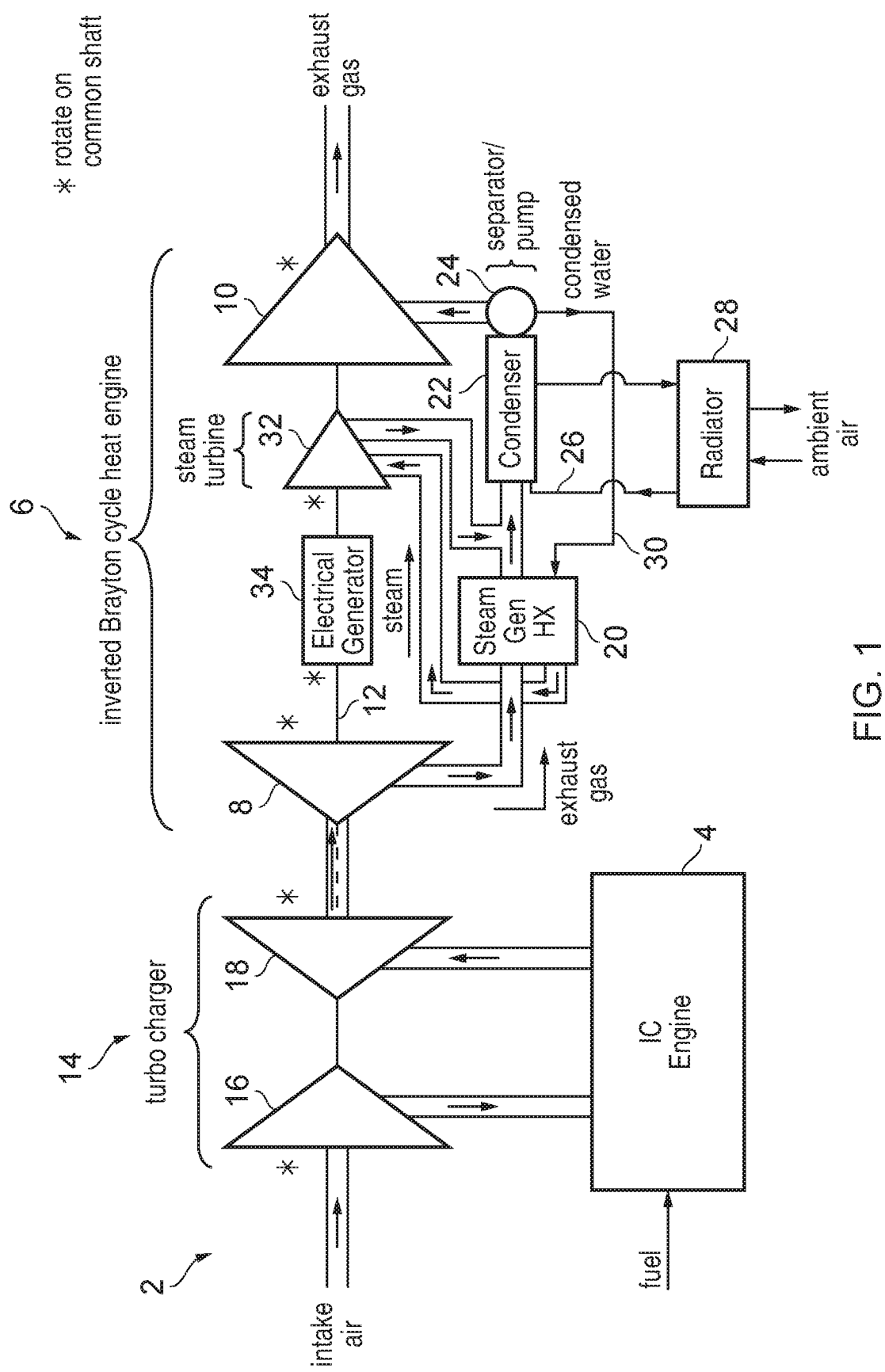

(51) Int. Cl.
  *F01K 23/12* (2006.01)
  *F02G 5/04* (2006.01)
  *F02G 5/02* (2006.01)
  *F02C 6/00* (2006.01)
  *F02C 7/08* (2006.01)

(52) U.S. Cl.
  CPC ............... *F02C 6/006* (2013.01); *F02G 5/02* (2013.01); *F02G 5/04* (2013.01); *F01N 2240/02* (2013.01); *F02C 7/08* (2013.01); *Y02T 10/12* (2013.01)

(56) References Cited

U.S. PATENT DOCUMENTS

| | | | | |
|---|---|---|---|---|
| 5,271,215 | A * | 12/1993 | Guillet | F02C 3/30 60/39.5 |
| 5,896,740 | A * | 4/1999 | Shouman | F01K 21/042 60/39.182 |
| 6,134,876 | A | 10/2000 | Hines et al. | |
| 6,148,602 | A * | 11/2000 | Demetri | F01K 23/068 60/39.12 |
| 6,263,661 | B1 * | 7/2001 | van der Burgt | F02C 3/34 60/39.17 |
| 6,293,086 | B1 * | 9/2001 | Reynolds | F02C 3/30 60/39.5 |
| 6,301,890 | B1 * | 10/2001 | Zeretzke | F01K 23/065 60/597 |
| 10,480,406 | B2 * | 11/2019 | Iijima | F02C 7/08 |
| 2012/0117979 | A1 | 5/2012 | Facchinetti et al. | |
| 2012/0137698 | A1 | 6/2012 | Sjödin | |
| 2014/0311136 | A1 | 10/2014 | Janssen | |

FOREIGN PATENT DOCUMENTS

| | | |
|---|---|---|
| CN | 104533621 | 4/2015 |
| DE | 29 33 369 | 3/1981 |
| DE | 30 05 631 | 8/1981 |
| DE | 10 2008 060 845 | 6/2010 |
| DE | 10 2014 003 283 | 9/2014 |
| DE | 10 2015 215 518 | 2/2017 |
| EP | 0 859 136 | 8/1998 |
| EP | 1 039 115 | 9/2000 |
| EP | 1 564 830 | 8/2005 |
| EP | 2 657 473 | 10/2013 |
| FR | 1 011 846 | 6/1952 |
| FR | 1 111 257 | 2/1956 |
| GB | 2 368 617 | 5/2002 |
| GB | 2 481 980 | 1/2012 |
| GB | 2 515 600 | 12/2014 |
| JP | H10-30407 | 2/1998 |
| JP | 2000-54854 | 2/2000 |
| JP | 2002-188438 | 7/2002 |
| JP | 2006-57597 | 3/2006 |
| JP | 2009-215906 | 9/2009 |
| WO | 00/60226 | 10/2000 |
| WO | 01/92710 | 12/2001 |
| WO | 2011/001311 | 1/2011 |

OTHER PUBLICATIONS

Search Report for GB1521853.0 dated Jun. 8, 2016, 3 pages.
First Office Action for CN Application No. 201680071036.6 dated Mar. 30, 2020 and English translation, 25 pages.
Japaneses Office Action and its English translation for Japanese Application No. 2018-528942, 16 pages, dated Dec. 7, 2020.

* cited by examiner

INVERTED BRAYTON CYCLE HEAT ENGINE

This application is the U.S. national phase of International Application No. PCT/GB2016/053867 filed Dec. 9, 2016 which designated the U.S. and claims priority to GB Patent Application No. 1521853.0 filed Dec. 11, 2015, the entire contents of each of which are hereby incorporated by reference.

This disclosure relates to heat engines. More particularly, this disclosure relates to inverted Brayton cycle heat engines.

It is known to provide inverted Brayton cycle heat engines having a turbine driven by hot gas with the exhaust gas from the turbine being compressed by a compressor sharing a common shaft with the turbine. In this way, energy can be extracted from the heat in the hot gas. Measures which increase the efficiency of energy recovery from the hot gas are advantageous.

At least some embodiments of the disclosure provide an apparatus comprising:

a plurality of heat engines each operating using a respective heat engine cycle, at least one of said plurality of heat engines combusting a fuel and generating exhaust gas comprising water as a combustion product, said plurality of heat engines including an inverted Brayton cycle heat engine having an inverted-Brayton-cycle turbine driven by said exhaust gas and an inverted-Brayton-cycle compressor driven by said inverted-Brayton-cycle turbine to receive and to compress said exhaust gas from said Inverted-Brayton-cycle turbine; and a condenser located in a fluid path of said exhaust gas between said inverted-Brayton-cycle turbine and said inverted-Brayton-cycle compressor to condense at least some of said water from said exhaust gas to form condensed water.

The present technique recognises that when the hot gas driving the Brayton cycle heat engine is exhaust gas resulting from combustion of fuel within another heat engine, then that exhaust gas may often contain water as a combustion product. Providing a condenser in the fluid path of the exhaust gas between the inverted-Brayton-cycle turbine and the inverted-Brayton-cycle compressor to condense at least some of the water within the exhaust gas has the advantage of reducing the mass flow through the inverted-Brayton-cycle compressor, thereby reducing the amount of work which needs to be done by this compressor in order to discharge the exhaust gas. The condensed water may be discharged with less work being required as increasing its pressure requires less energy due to the inherent incompressibility of the condensed water compared with increasing the pressure of the compressible exhaust gas using the inverted-Brayton-cycle compressor.

Having used a condenser to recover at least some condensed water (i.e. water in liquid form) from the exhaust gas, some embodiments of the invention may provide a recirculation path to supply at least some of this condensed water as part of a working fluid (generally) of at least one of the plurality of heat engines. This can increase the efficiency of operation of these heat engines.

In some example embodiments, the recirculation path may supply at least some of the condensed water as part of an intake fluid driving the inverted-Brayton-cycle turbine itself. This increases the amount of water within the exhaust gas passing through the inverted Brayton cycle heat engine in a manner which improves the efficiency with which the condenser can condense water out of that exhaust gas.

In other example embodiments, either separately from or in combination with the above, the plurality of heat engines include an internal combustion engine which combusts fuel to generate the exhaust gas. Within such systems, the recirculation path may supply at least some of the condensed water as part of an intake fluid of a heat engine cycle of the internal combustion engine. This can be used to improve the operating characteristics of the internal combustion engine, such as, for example, cooling the intake charge to increase its density, and/or reducing the level of undesired emissions in the exhaust gas.

In still further example embodiments, either in combination with the above features or separately therefrom, the plurality of heat engines may include a steam driven heat engine with the recirculation path supplying at least some of the condensed water to a steam-generating heat exchanger which transfers heat to the condensed water to generate stream which then drives the steam driven heat engine. This permits the steam-generating heat exchanger to act in conjunction with the steam driven heat engine to convert heat into work by the steam driven heat engine using the condensed water as the working fluid.

Whilst it will be appreciated that the steam driven heat engine could take a variety of different forms, one form well suited to this use is a steam turbine.

While the steam-generating heat exchanger may transfer heat from a variety of different sources to the condensed water to generate the steam to drive the steam driven heat engine, one particular arrangement which improves heat recovery from the system is when the steam-generating heat exchanger transfers heat from combusting the fuel to the condensed water, such as by extracting heat from the exhaust gas, possibly within the fluid flowing between the turbine and the compressor of the inverted Brayton cycle heat engine.

It is possible in some embodiments that the exhaust steam exiting the steam driven heat engine may be exhausted directly to the surrounding environment. However, in other embodiments, efficiency may be improved when the exhaust steam is supplied as at least part of a working fluid of at least one of the plurality of heat engines. Such a routing of the exhaust steam may improve the efficiency of the steam driven heat engine, and/or improve the efficiency, or other performance characteristics, of the receiving heat engine.

In some example embodiments the exhaust steam may be supplied into the exhaust gas flowing between the inverted-Brayton-cycle turbine and the inverted-Brayton cycle compressor. This point in the fluid path within the inverted Brayton cycle heat engine typically has a low pressure (e.g. below atmospheric pressure) increasing the efficiency with which the steam driven heat engine may operate.

The inverted Brayton-cycle turbine and the inverted-Brayton-cycle compressor may, in some example embodiments, be mounted on a common shaft. This common shaft may also drive an electrical generator to recover the energy from the inverted Brayton cycle heat engine. A mechanically efficient implementation may arrange such that the steam driven heat engine is also mounted on this common shaft. This reduces the number of components required and increases efficiency. Suitable configurations of the various turbines, compressors and heat engines (e.g. design rotation speed, size, moment of inertia, etc) will facilitate the sharing of a common shaft.

In embodiments in which an internal combustion engine operates in conjunction with the inverted Brayton cycle heat engine, the internal combustion engine may include, in addition to the inverted Brayton cycle heat engine, comprise a turbo charger having a turbo charger compressor and a turbo charger turbine which are also mounted on the common shaft thereby reducing component numbers and increasing efficiency.

Further embodiments of the disclosure provide an apparatus comprising:

a plurality of heat engine means for converting heat to work each operating using a respective heat engine cycle, at least one of said plurality of heat engine means combusting a fuel and generating exhaust gas comprising water as a combustion product, said plurality of heat engine means including an inverted Brayton cycle heat engine means having an inverted-Brayton-cycle turbine means driven by said exhaust for driving an inverted-Brayton-cycle compressor means for receiving and compressing said exhaust gas from said Inverted-Brayton-cycle turbine; and condenser means located in a fluid path of said exhaust gas between said inverted-Brayton-cycle turbine and said inverted-Brayton-cycle compressor for condensing at least some of said water from said exhaust gas to form condensed water.

Further embodiments of the disclosure provide a method operating heat engines comprising:

combusting a fuel and generating exhaust gas comprising water as a combustion product within at least one heat engine;

driving an inverted-Brayton-cycle turbine with said exhaust gas and driving an inverted-Brayton-cycle compressor with said inverted-Brayton-cycle turbine to receive and to compress said exhaust gas from said Inverted-Brayton-cycle turbine; and at a location in a fluid path of said exhaust gas between said inverted-Brayton-cycle turbine and said inverted-Brayton-cycle compressor, condensing at least some of said water from said exhaust gas to form condensed water.

Figure 2:
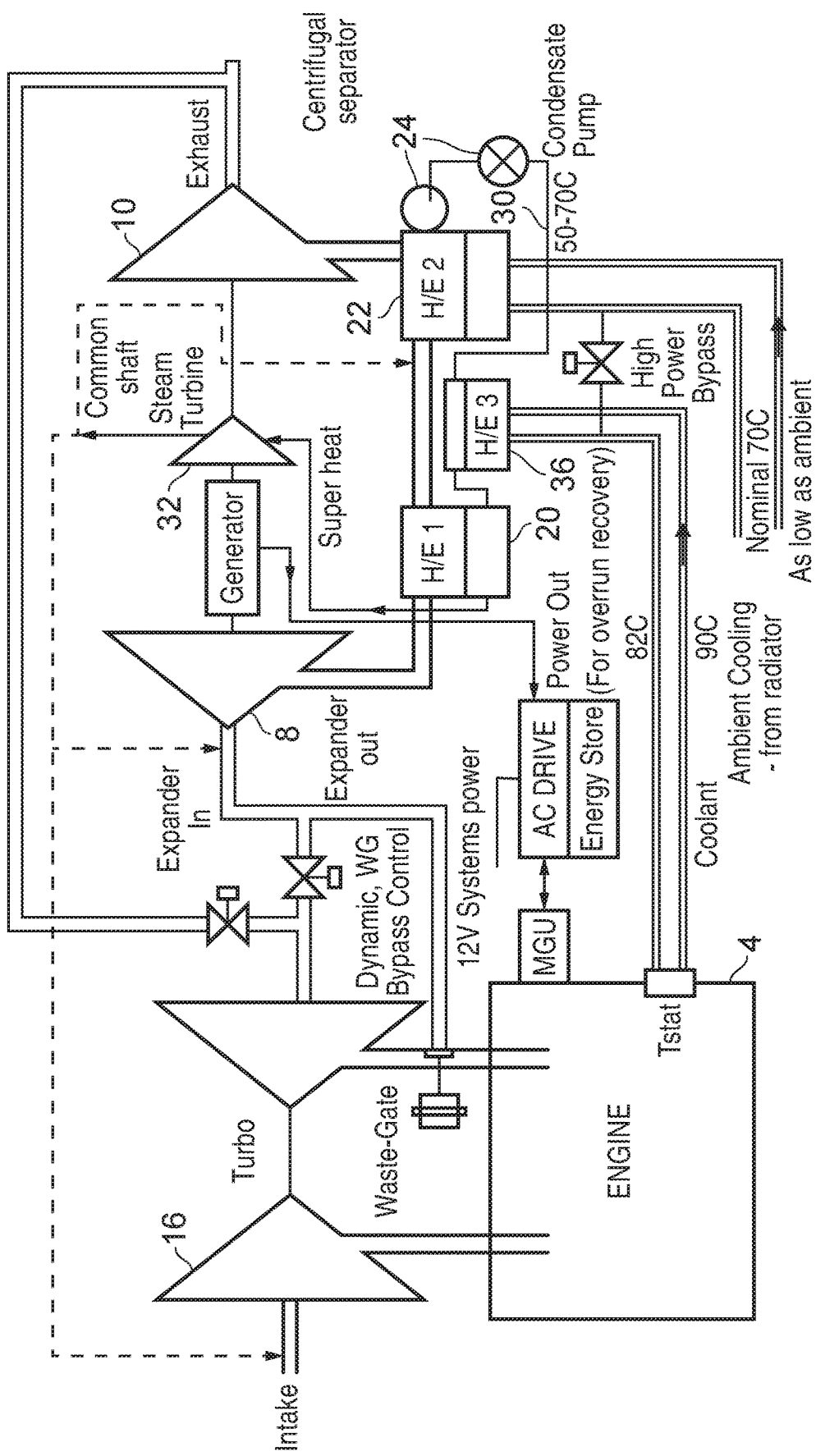
Figure 3:
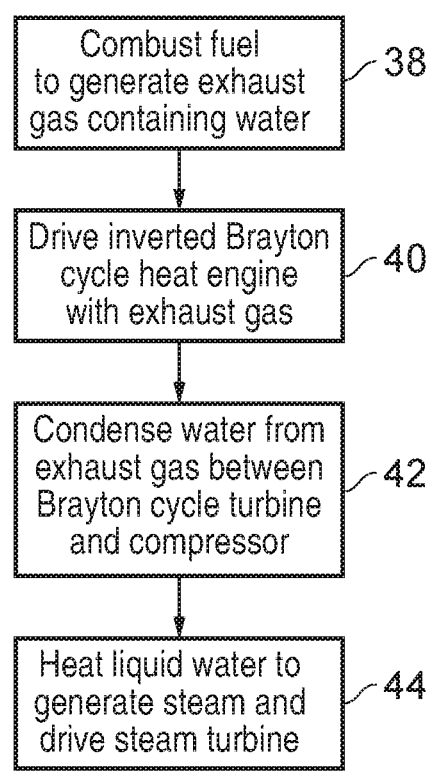

Example embodiments will now be described, by way of example only, with reference to the accompanying drawings in which:

FIG. 1 schematically illustrates a first example embodiment having a plurality of heat engines including an inverted Brayton cycle heat engine;

FIG. 2 schematically illustrates a second example embodiment having a plurality of heat engines including an inverted Brayton cycle heat engine; and FIG. 3 is a flow diagram schematically illustrating operation of the example embodiments of FIG. 1 and FIG. 2.

FIG. 1 schematically illustrates an apparatus 2 comprising a plurality of heat engines. These heat engines include an internal combustion engine 4 and an inverted Brayton cycle heat engine 6 including an inverted-Brayton-cycle turbine 8 and an inverted Brayton-cycle compressor 10 mounted on a common shaft 12. The internal combustion engine 4 has a turbo charger 14 including a turbo charger compressor 16 and a turbo charger turbine 18. In operation, intake air is compressed by the turbo charger compressor 16 and is mixed with fuel within the internal combustion engine 4 to drive the internal combustion engine 4 and to generate hot exhaust gas which passes through the turbo charger turbine 18 before entering the inverted Brayton cycle heat engine 6. The turbo charge compressor 16 and the turbo charger turbine 18 are mounted on the common shaft 12, (and could be a common part for part count reduction within a system) which also carries the inverted-Brayton-cycle turbine 8 and the inverted-Brayton-cycle compressor 10. In other example embodiments the turbo charger and the inverted-Brayton-cycle heat engine need not share a common shaft.

The hot exhaust gas entering the inverted Brayton cycle heat engine 6 contains water as a combustion product from the combustion of the fuel (e.g. petrol, diesel, LPG, LNG or combinations thereof) and air by the internal combustion engine 4. The exhaust gas drives the inverted-Brayton-cycle turbine 8 and exits therefrom at a reduced pressure, e.g. below atmospheric pressure. The exhaust gas follows along a fluid path between the inverted-Brayton-cycle turbine 8 and the inverted-Brayton-cycle compressor 10. This fluid path passes through a steam-generating heat exchanger 20 and a condenser 22. The condenser 22 serves to condense water from the exhaust gas to form condensed water (i.e. liquid water). A separator/pump 24 serves to separate the condensed water from the exhaust gas, raise its pressure (using relatively little energy due to the incompressibility of the liquid water) and supply the condensed water to a recirculation path 30. The exhaust gas without the condensed water has a reduced mass flow rate. The exhaust gas without the condensed water passes through the inverted-Brayton-cycle compressor 10 which raises its pressure to a point where it may be exhausted to, for example, the atmosphere. In some embodiments the condensed water may simply be discarded and not recirculated as in the embodiment of FIG. 1.

The condenser 22 is supplied with a circulating flow of coolant 26 which is maintained at a temperature substantially corresponding to the ambient air temperature surrounding apparatus 2 by a radiator 28. The circulating flow of coolant 26 is separate from the recirculation path 30. The circulation flow of coolant 26 forms a closed loop path (with no opening into the fluid path taken by the exhaust gas through the inverted-Brayton-cycle turbine 8 and inverted-Brayton-cycle compressor 10).

In this example embodiment, the recirculation path 30 from the separator/pump 24 supplies the condensed water to the steam-generating heat exchanger 20 where it is heated by the exhaust gas passing through the inverted Brayton cycle heat engine to generate steam. This steam drives a steam driven heat engine in the form of a steam turbine 32 which is also mounted on the common shaft 12. The exhaust steam from the steam turbine 32 is discharged into the fluid path of the exhaust gas flowing between the steam-generating heat exchanger 20 and the condenser 22. This exhaust steam from the steam turbine could be introduced at other points in the system, e.g. other points between the inverted-Brayton-cycle turbine 8 and the inverted-Brayton-cycle compressor 10.

In operation, the internal combustion engine 4 combusts fuel mixed with the intake air to extract work therefrom and generates hot exhaust gas containing water. The inverted Brayton cycle heat engine 6 serves to extract work from the hot exhaust gas which is used to drive an electrical generator 34, which is also mounted on the common shaft 12. Furthermore, the condenser 22 extracts water from the exhaust gas to form condensed water into which the steam-generating heat exchanger 20 transfers heat energy to generate steam that in turn drives the steam turbine 32. The steam turbine 32 also contributes to driving the electrical generator 34 to generate electrical energy.

FIG. 2 illustrates a further example embodiment of an apparatus comprising a plurality of heat engines and similar to that illustrated in FIG. 1. In this example embodiment, the recirculation path 30 for the condensed water additionally passes through a further heat exchanger 36 using which heat energy from a coolant liquid of the internal combustion engine 4 is transferred into the condensed water. Separating the condensed water from the exhaust gas may be achieved in a variety of ways, e.g. a centrifugal condensed water separator 24. Additionally or alternatively the heat exchanger of the condenser 22 may be formed to provide and/or enhance the separation. The steam-generating heat exchanger 20 further heats this condensed water to generate steam which drives the steam turbine 32. The exhaust steam (which was the condensed water) from the steam turbine 32 is illustrated as recirculating to a variety of different points. As in FIG. 1, one of the points to which the exhaust steam may be directed is into the exhaust gas fluid path entering the condenser 22. A further point at which the exhaust steam may alternatively, or additionally, be introduced is at the intake to the inverted-Brayton-cycle turbine 8. A still further point at which the exhaust steam may be reintroduced into the fluid path alternatively, or additional, to the previously mentioned points, is at the intake of the turbo charger compressor 16. The recirculation path thus passes from the separator/pump 24 through the further heat exchanger 36 and the steam-generating heat exchanger 20 to the steam turbine 32. From the steam turbine 32, the recirculation path may follow a variety of different paths separately or in combination including the ones mentioned above as well as a path directly leading to the exhaust of the inverted-Brayton-cycle compressor 10.

In some example embodiments the design may be simplified by using a common shaft and omitting the inverted-Brayton-cycle turbine 8 such that the exhaust gas passes directly from the turbo charger turbine (which serves as the inverted-Brayton-cycle turbine) to the heat exchangers and condenser 20, 36, 22.

In some embodiments the steam turbine 32 and the inverted-Brayton-cycle turbine 8 may be combined as a hybrid exhaust/steam turbine.

In some embodiments the system of FIG. 2 may be modified to include a heat pump between the further heat exchanger 36 and the coolant circuit from the internal combustion engine 4 to allow a greater proportion of the heat from the engine coolant to be utilised. Additionally or alternatively a heat pump may also be provided between the ambient coolant supply and the condenser 22.

FIG. 2 illustrates a dynamic waste gate and controller for controlling what proportion of exhaust gas from the turbo charger passes to the inverted-Brayton-cycle turbine 8 and what proportion is directed into a bypass path to exhaust to the atmosphere. The system of FIG. 2 may be designed to operate at high efficiency at a particular load upon the internal combustion engine 4 (e.g. up to 30%) internal combustion engine is directed to bypass the inverted-Brayton-cycle heat engine.

FIG. 3 is a flow diagram schematically illustrating operation of the example embodiments of FIG. 1 and FIG. 2. It will be appreciated that in practice the steps illustrated in FIG. 3 will be performed in parallel. At step 38 fuel and air are combusted by the internal combustion engine 4 to generate exhaust gas containing water. At step 40 the inverted Brayton cycle heat engine is driven by the heat exhaust gas from the internal combustion engine 4 to extract work therefrom. At step 42 water is condensed from the exhaust gas flowing through the inverted Brayton-cycle heat engine between the turbine and the compressor. At step 44 the condensed water in liquid form is heated to generate steam (possibly using the exhaust gas flowing through the inverted Brayton cycle heat engine, or another source of heat) before this steam drives the steam turbine 32. The inverted Brayton cycle heat engine 6 and the steam turbine 32 together convert heat into mechanical work which may, for example, be used to drive the electrical generator 34 or contribute to the driving of the turbo charger 14 or perform some other work within the apparatus 2.

The invention claimed is:

1. An apparatus comprising:
a plurality of heat engines each operating using a respective heat engine cycle, at least one of said plurality of heat engines combusting a fuel and generating exhaust gas comprising water as a combustion product, said plurality of heat engines including an inverted Brayton cycle heat engine having an inverted-Brayton-cycle turbine driven by said exhaust gas and an inverted-Brayton-cycle compressor driven by said inverted-Brayton-cycle turbine to receive and to compress said exhaust gas from said Inverted-Brayton-cycle turbine,
a condenser located in a fluid path of said exhaust gas between said inverted-Brayton-cycle turbine and said inverted-Brayton-cycle compressor to condense at least some of said water from said exhaust gas to form condensed water,
wherein the condenser is supplied with a circulating flow of coolant, wherein the circulating flow of coolant is separate from the fluid path of said exhaust gas and forms a closed loop path, and
wherein said plurality of heat engines comprise a steam driven heat engine and a recirculation path supplying at least some of said condensed water to a steam-generating heat exchanger to transfer heat to said condensed water to generate steam to drive said steam driven heat engine, wherein exhaust steam exiting said steam driven heat engine is supplied as at least part of a working fluid of at least one of said one or more heat engines, wherein said exhaust steam is supplied into said exhaust gas flowing between said inverted-Brayton-cycle turbine and said inverted-Brayton-cycle compressor upstream of the inverted-Brayton-cycle compressor and downstream of the steam-generating heat exchanger.

2. An apparatus as claimed in claim 1, wherein the recirculation path supplies at least some of said condensed water as at least part of a working fluid of at least one of said plurality of heat engines.

3. An apparatus as claimed in claim 2, wherein said recirculation path supplies at least some of said condensed water as part of an intake fluid driving said inverted-Brayton-cycle turbine.

4. An apparatus as claimed in claim 1, wherein said plurality of heat engines comprise an internal combustion engine to combust said fuel and to generate said exhaust gas.

5. An apparatus as claimed in claim 2, wherein said recirculation path supplies at least some of said condensed water as part of an intake fluid of a heat engine cycle of said internal combustion engine.

6. An apparatus as claimed in claim 1, wherein said steam driven heat engine is a steam turbine.

7. An apparatus as claimed in claim 1, wherein said steam-generating heat exchanger transfers heat from combusting said fuel to said condensed water.

8. An apparatus as claimed in claim 7, wherein said steam-generating heat exchanger transfers heat to said condensed water from exhaust gas flowing in said fluid path of said exhaust gas between said inverted-Brayton-cycle turbine and said inverted-Brayton-cycle compressor.

9. An apparatus as claimed in claim 1, wherein said inverted-Brayton-cycle turbine and said inverted-Brayton-cycle compressor are mounted on a common drive shaft.

10. An apparatus as claimed in claim 9, wherein said common drive shaft drives an electrical generator.

11. An apparatus as claimed in claim 1, wherein said inverted-Brayton-cycle turbine and said inverted-Brayton-cycle compressor are mounted on a common drive shaft, and said steam driven heat engine is mounted on said common shaft.

12. An apparatus as claimed in claim 4, wherein said inverted-Brayton-cycle turbine and said inverted-Brayton-cycle compressor are mounted on a common drive shaft, and said internal combustion engine comprises a turbo charger having a turbo charger compressor and a turbo charger turbine mounted on said common shaft.

13. An apparatus comprising:
a plurality of heat engine means for converting heat to work each operating using a respective heat engine cycle, at least one of said plurality of heat engine means combusting a fuel and generating exhaust gas comprising water as a combustion product, said plurality of heat engine means including an inverted Brayton cycle heat engine means having an inverted-Brayton-cycle turbine means driven by said exhaust for driving an inverted-Brayton-cycle compressor means for receiving and compressing said exhaust gas from said Inverted-Brayton-cycle turbine,
condenser means located in a fluid path of said exhaust gas between said inverted-Brayton-cycle turbine and said inverted-Brayton-cycle compressor for condensing at least some of said water from said exhaust gas to form condensed water,
wherein the condenser is supplied with a circulating flow of coolant, wherein the circulating flow of coolant is separate from the fluid path of said exhaust gas and forms a closed loop path, and
wherein said plurality of heat engines comprise a steam driven heat engine and a recirculation path supplying at least some of said condensed water to a steam-generating heat exchanger to transfer heat to said condensed water to generate steam to drive said steam driven heat engine, wherein exhaust steam exiting said steam driven heat engine is supplied as at least part of a working fluid of at least one of said one or more heat engines, wherein said exhaust steam is supplied into said exhaust gas flowing between said inverted-Brayton-cycle turbine and said inverted-Brayton-cycle compressor upstream of the inverted-Brayton-cycle compressor and downstream of the steam-generating heat exchanger.

14. A method operating heat engines comprising:
combusting a fuel and generating exhaust gas comprising water as a combustion product within at least one heat engine;
driving an inverted-Brayton-cycle turbine with said exhaust gas and driving an inverted-Brayton-cycle compressor with said inverted-Brayton-cycle turbine to receive and to compress said exhaust gas from said Inverted-Brayton-cycle turbine,
at a location in a fluid path of said exhaust gas between said inverted-Brayton-cycle turbine and said inverted-Brayton-cycle compressor, condensing at least some of said water from said exhaust gas to form condensed water,
wherein the condenser is supplied with a circulating flow of coolant, wherein the circulating flow of coolant is separate from the fluid path of said exhaust gas and forms a closed loop path, and
wherein said plurality of heat engines comprise a steam driven heat engine and a recirculation path supplying at least some of said condensed water to a steam-generating heat exchanger to transfer heat to said condensed water to generate steam to drive said steam driven heat engine, wherein exhaust steam exiting said steam driven heat engine is supplied as at least part of a working fluid of at least one of said one or more heat engines, wherein said exhaust steam is supplied into said exhaust gas flowing between said inverted-Brayton-cycle turbine and said inverted-Brayton-cycle compressor upstream of the inverted-Brayton-cycle compressor and downstream of the steam-generating heat exchanger.

* * * * *